(12) United States Patent
Chiu et al.

(10) Patent No.: US 8,853,970 B1
(45) Date of Patent: Oct. 7, 2014

(54) ELECTROMAGNETIC COUPLING MULTI-OUTPUT CONTROL CIRCUIT

(71) Applicant: Anwell Semiconductor Corp., Hsin-Chu (TW)

(72) Inventors: Shao-Wei Chiu, Hsin-Chu (TW); Chun-Chieh Kuo, Hsin-Chu (TW); Cheng-Po Hsiao, Hsin-Chu (TW); Shih-Ping Tu, Hsin-Chu (TW)

(73) Assignee: Anwell Semiconductor Corp., Hsinchu (TW)

( * ) Notice: Subject to any disclaimer, the term of this patent is extended or adjusted under 35 U.S.C. 154(b) by 29 days.

(21) Appl. No.: 13/855,123

(22) Filed: Apr. 2, 2013

(51) Int. Cl.
*H05B 37/02* (2006.01)
*H05B 41/282* (2006.01)
*H05B 33/08* (2006.01)

(52) U.S. Cl.
CPC ........ *H05B 41/2822* (2013.01); *H05B 33/0815* (2013.01)
USPC ............ 315/311; 315/162; 315/218; 315/307

(58) Field of Classification Search
CPC ......................... H05B 33/0815; H05B 41/2822
USPC ............ 315/160–162, 209 R, 218, 291, 294, 315/297, 307, 311
See application file for complete search history.

(56) References Cited

U.S. PATENT DOCUMENTS

| 2011/0248638 A1* | 10/2011 | Aso ............................ 315/185 R |
| 2012/0007512 A1* | 1/2012 | Kim et al. ..................... 315/152 |
| 2012/0146530 A1* | 6/2012 | Han et al. ...................... 315/219 |

\* cited by examiner

*Primary Examiner* — Jason M Crawford
(74) *Attorney, Agent, or Firm* — Rosenberg, Klein & Lee (57) ABSTRACT

Disclosed is an electromagnetic coupling multi-output control circuit having a detection unit, a switching unit and a coupling unit, and the coupling unit is coupled to a side of a transformer of a power driving device to sense and produce a second driving voltage, such that the transformer has a multi-output function. The switching unit is provided for receiving and outputting the second driving voltage to a second driving load, and the detection unit is provided for detecting the second driving voltage to produce a detection value, so that the switching unit analyzes the detection value and switches outputting a frequency of the second driving voltage to stabilize the voltage value of the second driving voltage, so as to flexibly increase the number of output voltages of the power driving device while lowering the cost and expand the scope of applicability.

12 Claims, 6 Drawing Sheets

ELECTROMAGNETIC COUPLING MULTI-OUTPUT CONTROL CIRCUIT

BACKGROUND OF THE INVENTION

1. Field of the Invention

The present invention relates to the technical field of power supply devices, and more particularly to an electromagnetic coupling multi-output control circuit using a coupling coil to increase output voltage, and stabilizing voltage by a control of non-inductive duty cycles to maintain a constant output voltage value, so as to improve energy conversion efficiency.

2. Description of the Related Art

Figure 1:
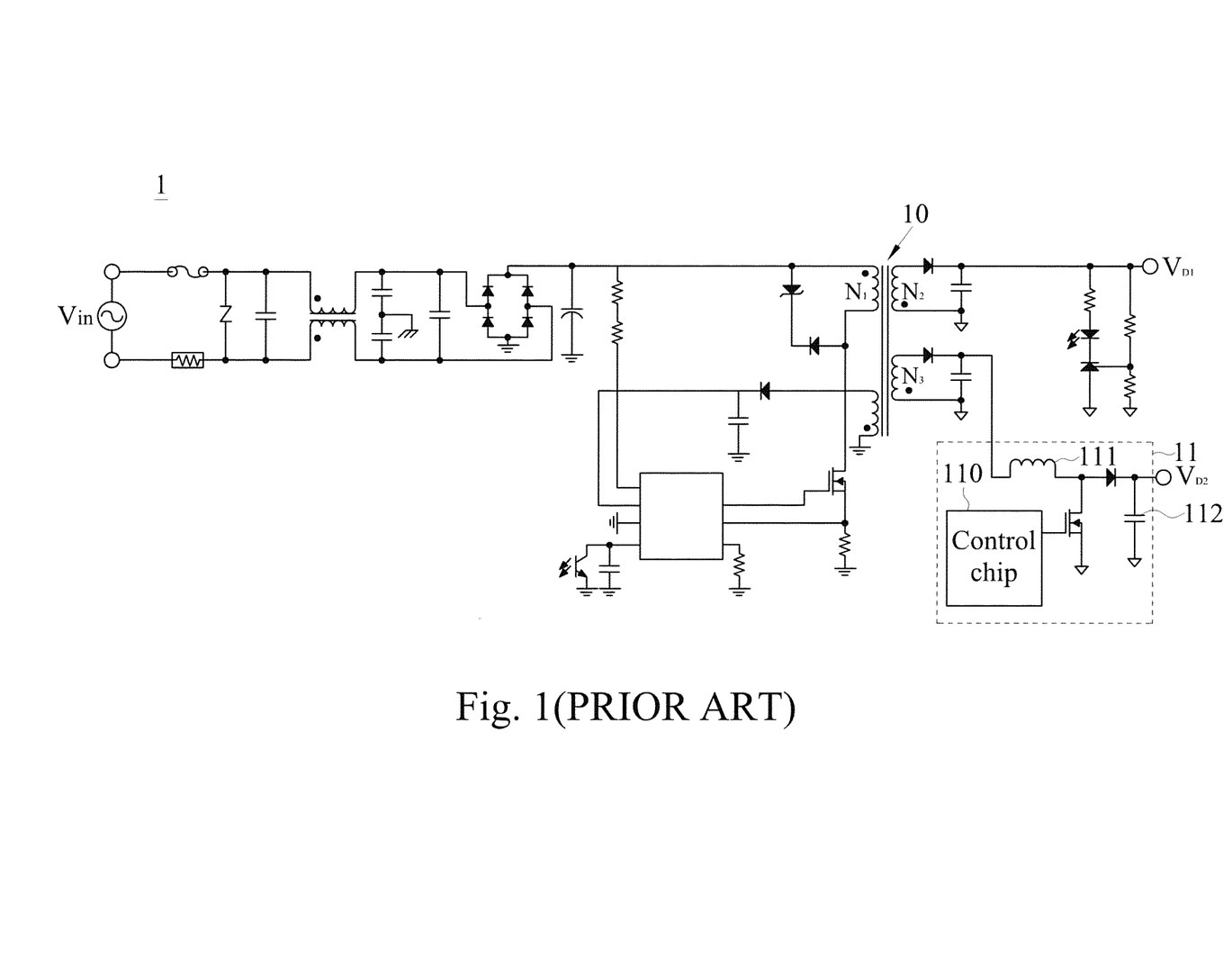
FIG. 1 is a schematic circuit diagram of a conventional power driving device.
Figure 2:
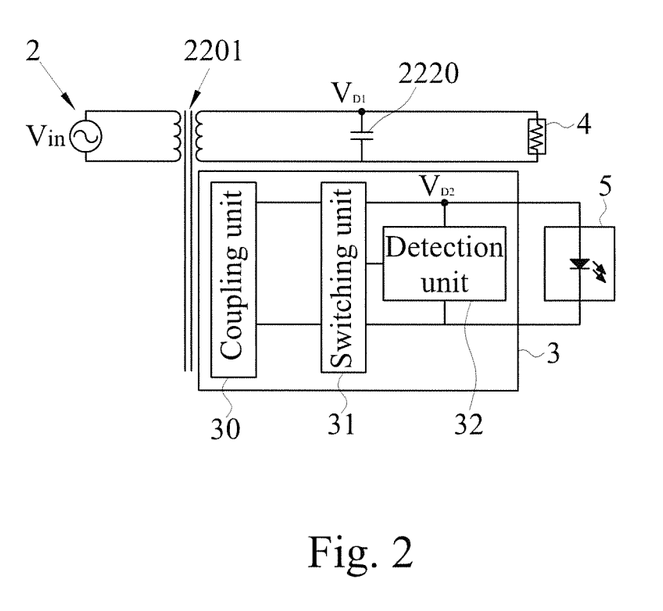
FIG. 2 is a schematic block diagram of a first implementation mode of a preferred embodiment of the present invention.
Figure 3:
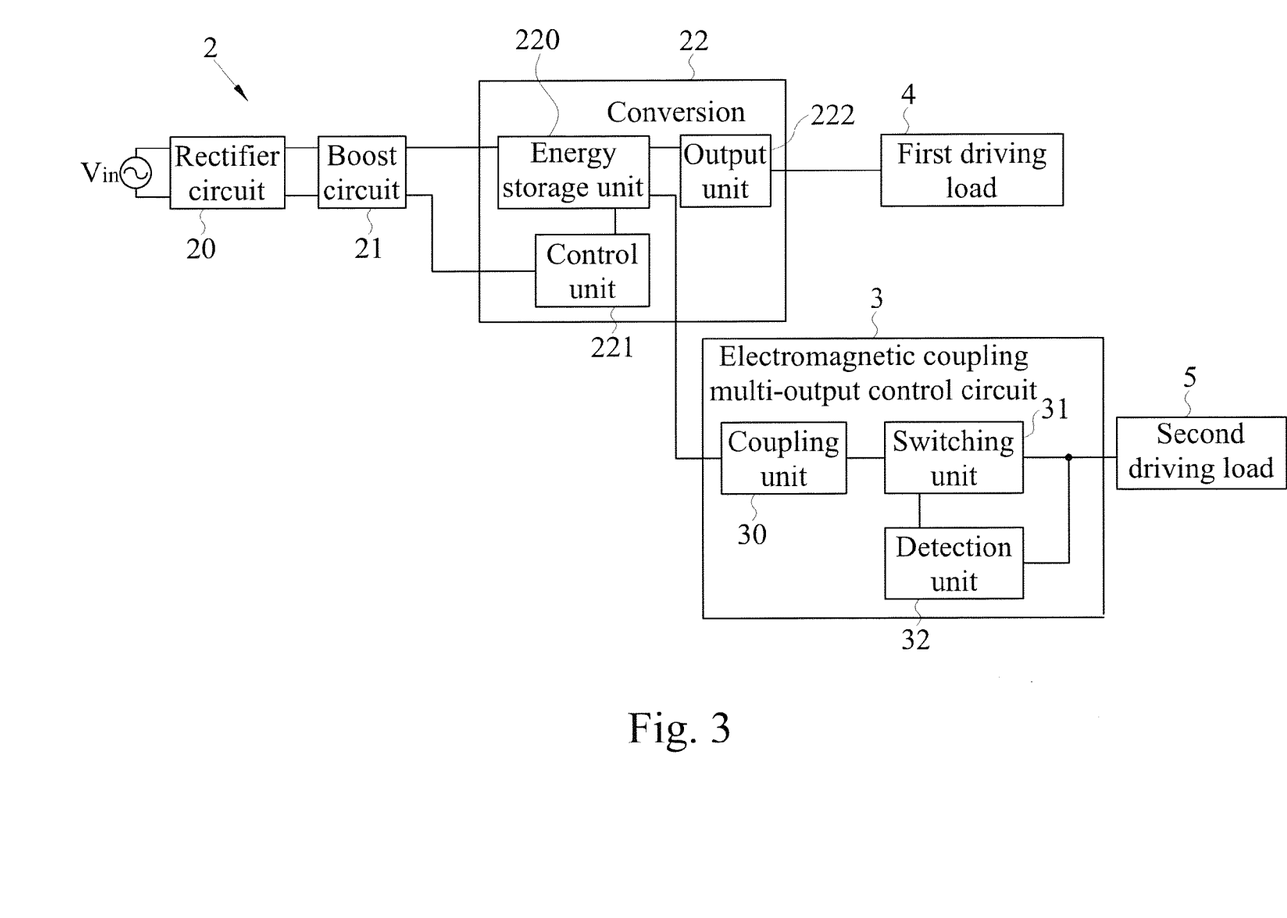
FIG. 3 is a schematic block diagram of a second implementation mode of a preferred embodiment of the present invention.

Switching power supply (SPS) generally comes with a fly-back, forward, full bridge, half bridge or push-pull circuit architecture and features the advantages of high efficiency, small volume, light weight, easy installation and large output voltage range, so that the switching power supply can be used extensively in various electronic devices to improve the quality of operations. With reference to FIG. 1 for a power driving device 1 of a display device, a primary side control fly-back conversion circuit architecture is adopted, and the power driving device 1 uses a primary side coil ($N_1$) of a coupling transformer 10 to sense a filtered and rectified input voltage ($V_{in}$) to form a primary side current, so that a coil ($N_2$) of the secondary side is affected by the change of the primary side current to sense a first driving voltage ($V_{D1}$) with an output voltage of 5V, while another coil ($N_3$) of the secondary side is also affected by the change of the primary side current to sense a second driving voltage ($V_{D2}$) with an output voltage of 28V for driving a plurality of light emitting diodes (LED) of a backlight source.

Due to the instable second driving voltage caused by manufacturing errors of the LED and a change of the input voltage source, the power driving device 1 comes with a stabilizing control circuit 11 connected to the coil ($N_3$), so that a boost control chip 110 can be used to modulate the frequency required for the resonance of an inductor 111 and a capacitor 112 to output a rated voltage. The power driving device 1 requires a set of the stabilizing control circuit 11 for every additional outputting voltage, thus resulting in a more complicated structure and incurring a higher cost.

In view of the aforementioned problems, it is a main subject for the invention to simplify the circuit architecture of the stabilizing control circuit 11 to achieve the function of supplying a plurality of stable output voltages while reducing the cost.

SUMMARY OF THE INVENTION

In view of the problems of the prior art, it is a primary objective of the present invention to overcome the problems by providing a power driving device electromagnetic coupling multi-output control circuit that provides the required output voltage with a stable voltage value by the coupling effect and the feedback control principle and flexibly increases the number of output voltages of the power driving device while simplifying the overall circuit structure and reducing the cost.

To achieve the aforementioned objective, the present invention provides an electromagnetic coupling multi-output control circuit applied in a power driving device of an illumination device such as an LCD, a television or a light emitting diode lamp to allow the power driving device to have the function of a plurality of output voltages, and the power driving device senses an input voltage by a transformer to produce a first driving voltage and outputs the first driving voltage to a first driving load of the illumination device, characterized in that the electromagnetic coupling multi-output control circuit comprises a detection unit, a switching unit and a coupling unit, and the coupling unit is electromagnetically coupled to a side of the transformer to sense and produce a second driving voltage, and the switching unit is electrically coupled to the coupling unit, and a second driving load and the detection unit of the illumination device, and the switching unit receives and outputs the second driving voltage to the second driving load, and the detection unit detects the second driving voltage to produce a detection value, such that the switching unit can analyze the detection value to switch and output the frequency of the second driving voltage, so as to achieve the effect of stabilizing the voltage value of the second driving voltage.

Wherein, the power driving device has a switching power supply conversion circuit architecture such as a fly-back, forward, full bridge, half bridge or push-pull architecture, and the transformer is electromagnetically coupled to a plurality of types of the electromagnetic coupling multi-output control circuits to output a plurality of types of the second driving voltages, and the second driving voltages come with different stable voltage values.

To enhance the stability of the output voltage, the electromagnetic coupling multi-output control circuit further comprises a driving capacitor coupled to the switcher and the second driving load for charging and discharging the second driving voltage to supply a stable voltage to the second driving load.

In addition, the coupling unit is a coupling coil, and the detection unit is a voltage-division resistor for dividing the second driving voltage to produce the detection value, or when there are a plurality of second driving loads connected in parallel with each other, and the detection unit has a multi-channel constant current circuit (or current matching circuit) with the current mirror circuit architecture and a minimum voltage detection circuit. The multi-channel constant current circuit is serially connected to the second driving loads to obtain a plurality of driving currents, and the minimum voltage detection circuit is electrically coupled to the multi-channel constant current circuit for detecting the driving currents to compute and obtain the detection value with a minimum voltage value. Therefore, any circuit using a coupling transformer for converting energy can add the electromagnetic coupling multi-output control circuit of the present invention to increase the output voltages, and the components of the present invention can be adjusted according to the actual requirements for the current or constant voltage control to meet the requirements of desired applications and expand the scope of applicability significantly.

The switching unit comprises an error amplifier, a comparator, a triangular wave generator and the switcher, and the switcher comprises a diode, a transistor, a D-type flip-flop and a switch. The error amplifier has a positive input terminal for receiving the detection value and a negative input terminal for receiving a reference value. The output terminal is coupled to a negative input terminal of the comparator. The comparator has a positive input terminal coupled to the triangular wave generator, and the output terminal of the comparator is coupled to an input terminal of the D-type flip-flop, and the D-type flip-flop has an output terminal coupled to a trigger terminal of the switch. The first transistor has a source coupled to the detection unit and the second driving load, a drain coupled to the coupling coil through the diode, and a gate coupled to a terminal of the switch, so that both terminals of the switcher are coupled to the coupling unit and the second driving load respectively for transferring and controlling the second driving voltage to achieve the effect of outputting the required output voltage value.

In addition, researches show that if the power driving device has a buck circuit electrically coupled to the transformer for receiving and stepping down the input voltage and outputting the input voltage to the transformer, the transformer can be a component with a low voltage resisting property to reduce the cost, and no additional energy conversion component is required for producing the first driving voltage and the second driving voltage from the directly sensing and stepping-down input voltage to achieve the effect of increasing a power factor.

In summation of the description above, the switching unit and the detection unit of the present invention are provided, so that when the power driving device outputs a plurality of output voltages, a complicated conventional stabilizing control circuit is no longer required to cope with each set of output voltages, so as to simplify the structure and lower the cost, and the number of output voltages can be increased flexibly according to the actual requirements. On the other hand, the actual experiments show that the efficiency of driving the second driving load reaches up to 82% which is much better than the driving efficiency (75%) of the conventional structure. The invention reduces power loss to save energy.

DETAILED DESCRIPTION OF THE PREFERRED EMBODIMENTS

The technical content of the present invention will become apparent with the detailed description of preferred embodiments and the illustration of related drawings as follows. It is noteworthy that same numerals used in the following preferred embodiments and related drawings represent respective elements of the invention.

With reference to FIGS. 2 to 5 for a schematic block diagram of the first implementation mode, a schematic block diagram and a circuit diagram of the second implementation mode, and a circuit diagram of the third implementation mode of an electromagnetic coupling multi-output control circuit in accordance with a preferred embodiment of the present invention respectively, the electromagnetic coupling multi-output control circuit 3 is installed in a power driving device 2 to provide the function of supplying a plurality of output voltages of the power driving device 2 for the use of an illumination device such as a liquid crystal display (LCD), a television or a light emitting diode (LED) lamp. The power driving device 2 comprises a rectifier circuit 20, a boost circuit 21, and a conversion control circuit 22, wherein the conversion control circuit 22 is a switching or LLC serially connected harmonic power conversion circuit such as a flyback, forward, full bridge, half bridge or push-pull circuit having a coupling coil, and the main structure of the conversion control circuit 22 comprises an energy storage unit 220, a control unit 221 and an output unit 222.

For example, the conversion control circuit 22 is a fly-back power conversion circuit, and the energy storage unit 220 has a transformer 2201 with a primary side coil ($N_1$) and a secondary side coil ($N_2$), and the control unit 221 includes a current transistor 2210, a current resistor 2211 and a control chip 2212, and the primary side coil is serially connected to the current transistor 2210 and the current resistor 2211 and then coupled to the control chip 2212, and the secondary side coil such as an audio player of an LCD system processor or a television is coupled to a first driving load 4 of the illumination device through the output unit 222. The rectifier circuit 20 is a bridge rectifier circuit coupled to an external power supply and the boost circuit 21 for receiving an input voltage ($V_{in}$) of an alternate current and rectifying the alternate current to produce the input voltage of a direct current. The boost circuit 21 is a boost power factor correction (Boost PFC) circuit coupled to the primary side coil for boosting the input voltage and an energy storage capacitor 210 is provided for charging and discharging electric power and provided for the primary side coil to store energy to form a primary side current ($I_1$). By the principle of electromagnetic induction, the secondary side coil senses a change of the primary side current, and then an output capacitor 2220 charges or discharges electric power to produce a first driving voltage ($V_{D1}$) and supply the first driving voltage ($V_{D1}$) to drive the first driving load 4 to operate. It is noteworthy that the control chip 2212 immediately detects and modulates the current value of the primary side current to control the first driving voltage to a stable voltage value.

In addition, the conversion control circuit 22 includes the electromagnetic coupling multi-output control circuit 3 having a coupling unit 30, a switching unit 31, a detection unit 32 and a driving capacitor 33, wherein the coupling unit 31 is a coupling coil ($N_3$) electromagnetically coupled to a side of the transformer 2201, such that when the output capacitor 2220 stores the energy transmitted from the primary side of the transformer 2201, the principle of electromagnetic induction is also used for sensing a change of the primary side current to produce a second driving voltage ($V_{D2}$). The switching unit 31 is electrically coupled to the coupling unit 31, the detection unit 32 and a second driving load 5 of the illumination device such as a light emitting diode lamp for transferring the second driving voltage to the second driving load 5. After the detection unit 32 detects the second driving voltage to produce a detection value, the switching unit 31 analyzes the detection value to switch outputting a frequency of the second driving voltage to stabilize the output voltage value and improve the overall circuit operation efficiency.

Figure 4:
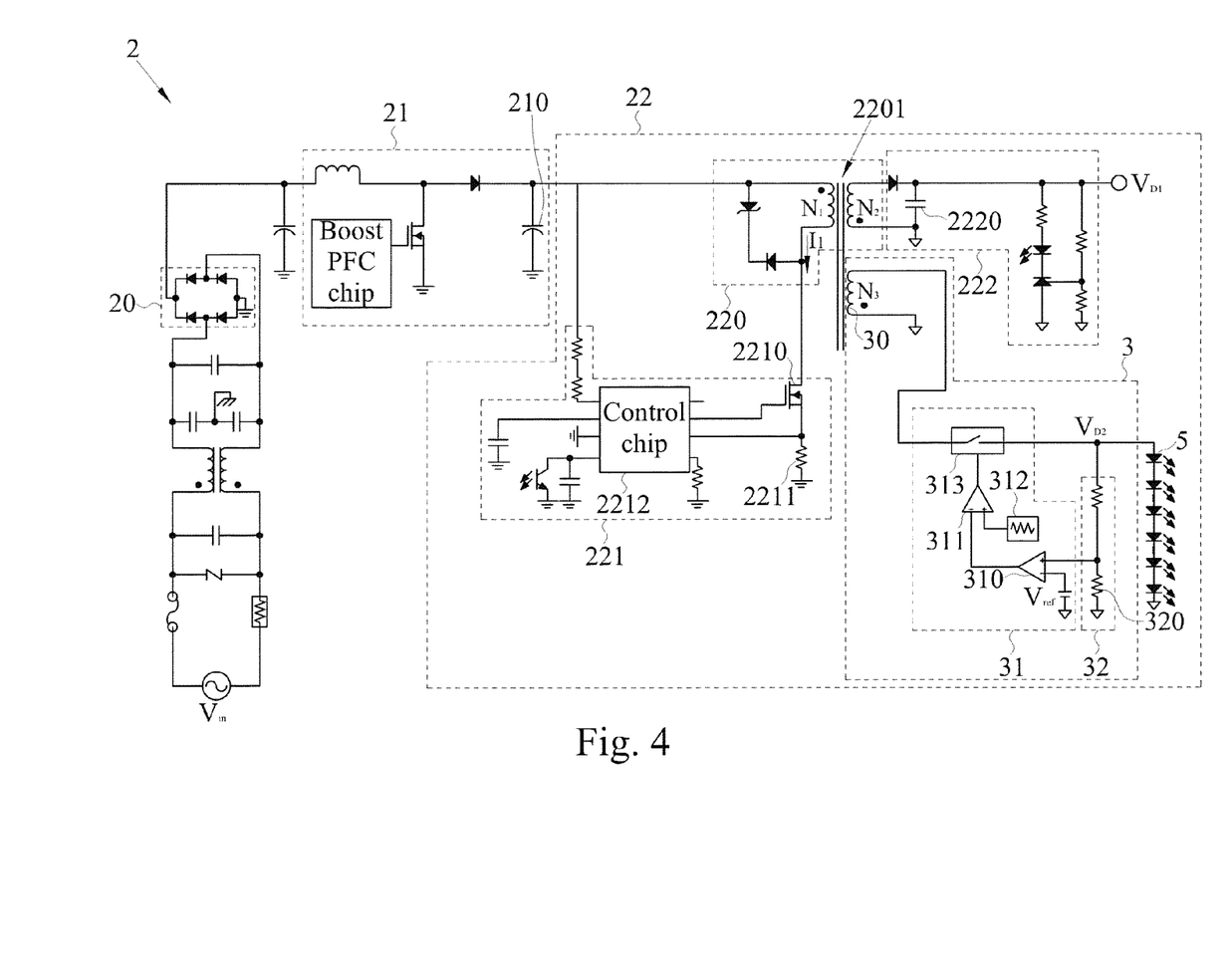
FIG. 4 is a circuit diagram of the second implementation mode of a preferred embodiment of the present invention.
Figure 5:
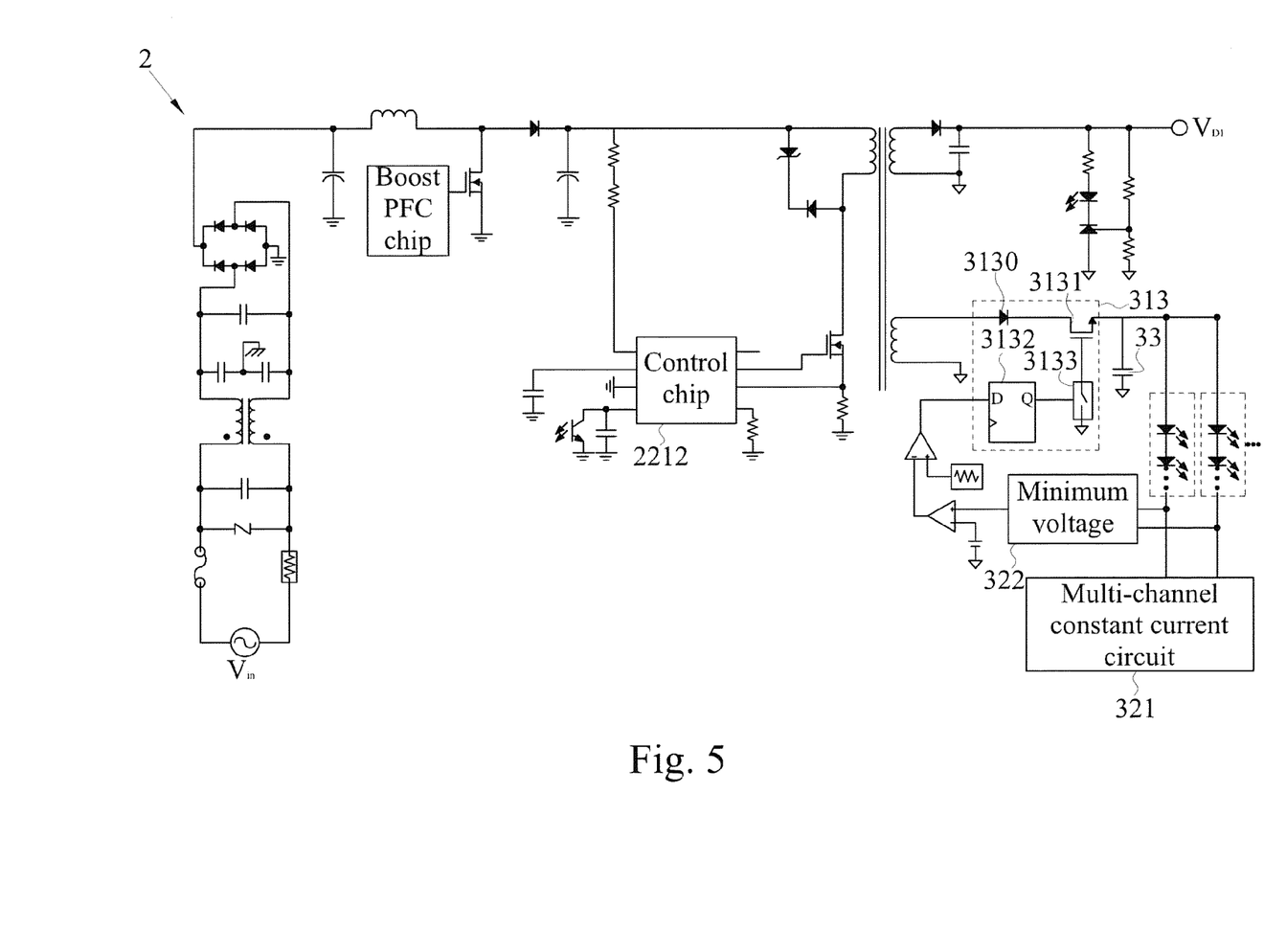
FIG. 5 is a circuit diagram of a third implementation mode of a preferred embodiment of the present invention.

In this implementation mode, the switching unit 31 comprises an error amplifier 310, a comparator 311, a triangular wave generator 312 and a switcher 313, wherein the switcher 313 is comprised of a diode 3130, a transistor 3131, a D-type flip-flop 3132 and a switch 3133. The error amplifier 310 has a positive input terminal for receiving the detection value and a negative input terminal for receiving a reference value ($V_{ref}$), and the output terminal is coupled to a negative input terminal of the comparator 311. The comparator 311 has a positive input terminal coupled to the triangular wave generator 312 for reading a triangular wave to obtain an upper limit and a lower limit, and its output terminal is coupled to an input terminal of the D-type flip-flop 3132, and an output terminal of the D-type flip-flop 3132 is coupled to a trigger terminal of the switch 3133. The transistor 3131 has a gate coupled to a terminal of the switch 3133, a source coupled to the driving capacitor 33, the detection unit 32 and the second driving load, and a drain coupled to the coupling coil through the diode 3130, such that when the D-type flip-flop 3132 triggers the switch 3133 to conduct the transistor 3131, the driving capacitor 33 is provided for charging and discharging the second driving voltage to supply a constant voltage value to the second driving load 5.

If the second driving load 5 is formed by connecting a plurality of light emitting diode lamps in series with one another (or the electromagnetic coupling multi-output control circuit 3 is in a constant voltage control mode, the detection unit 32 is a voltage-division resistor 320 for dividing the second driving voltage to produce the detection value. If the second driving load 5 is formed by connecting a plurality of light emitting diode lamps connected in parallel with one another (or the electromagnetic coupling multi-output control circuit 3 is in a constant current control mode), the detection unit 32 has a multi-channel constant current circuit 321 and a minimum voltage detection circuit 322, wherein the multi-channel constant current circuit 321 is a current mirror circuit connected in series with the light emitting diode lamps to obtain a plurality of driving currents passing through the light emitting diode lamps. The minimum voltage detection circuit 322 is electrically coupled to the multi-channel constant current circuit 321 for detecting the driving currents to compute and obtain the detection value with the minimum voltage value.

When the input voltage is changed by the physical properties of each light emitting diode, the error amplifier 310 compares the detection value with the reference value and amplifies the error between the two to generate a detection signal to the comparator 311, and if the detection signal is smaller than the lower limit, the comparator 311 will turn on the switcher 31 to output the second driving voltage, or else the switcher 31 will stop outputting the second driving voltage. Therefore, the present invention adjusts the conduction cycle of the transistor 3131 through a change error of a feedback voltage source to achieve the effect of stabilizing the second driving voltage value.

Figure 6:
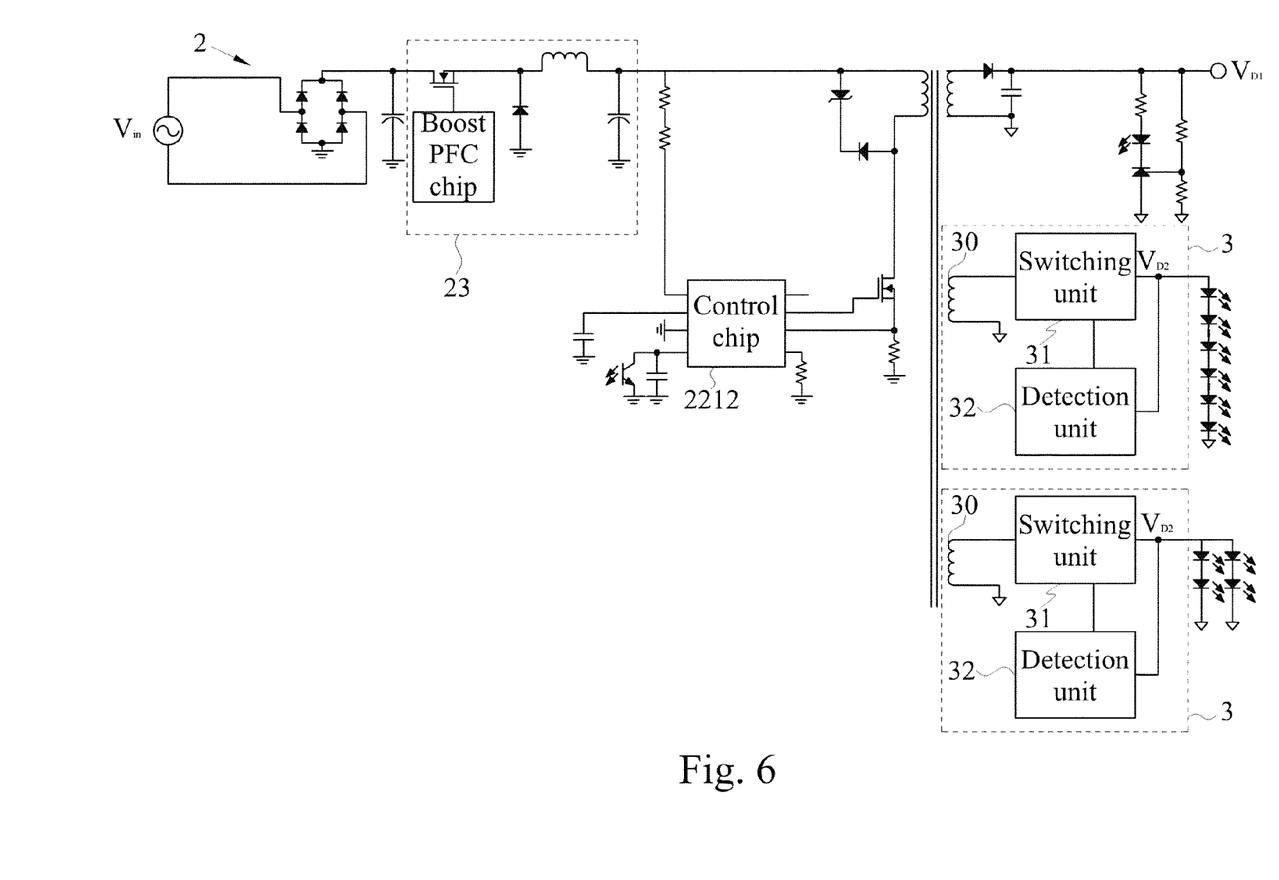
FIG. 6 is a schematic block diagram of a fourth implementation mode of a preferred embodiment of the present invention.

In addition, if it is necessary to increase the output voltage of the power driving device 2, the electromagnetic coupling multi-output control circuit 3 can be added as shown in FIG. 6 and electromagnetically coupled to a side of the transformer 2201, and the coupling unit 30 with different number of coils can be used to obtain the second driving voltages with different voltage values and a high stability. Further, the power driving device 2 uses a buck circuit 23 to replace the boost circuit 21, and the power driving device 2 is electrically coupled between the rectifier circuit 20 and the energy storage unit 220. The buck circuit 23 is a buck power factor correction (Buck PFC) circuit for receiving and stepping down the rectified input voltage and then outputting the input voltage to the transformer 2201. Experiments show that the power factor reaches up to 96% which is higher than the power factor (94%) of the boost circuit 21. Therefore, the transformer 2201 can directly sense the stepped-down input voltage to produce the first driving voltage and the second driving voltage, so as to enhance the power factor effectively.

What is claimed is:

1. An electromagnetic coupling multi-output control circuit, applied to a power driving device of an illumination device such as a liquid crystal display (LCD), a television or a light emitting diode (LED) lamp to allow the power driving device to have a multi output voltage function, and the power driving device using a transformer to sense an input voltage to produce a first driving voltage and then output the first driving voltage to a first driving load of the illumination device, characterized in that the electromagnetic coupling multi-output control circuit comprises a detection unit, a switching unit and a coupling unit, and the coupling unit is electromagnetically coupled to a side of the transformer to produce a second driving voltage, and the switching unit is electrically coupled to the coupling unit, a second driving load of the illumination device and the detection unit; and the switching unit receives and outputs the second driving voltage to the second driving load, and the detection unit detects the second driving voltage to produce a detection value, so that the switching unit can analyze the detection value to switch and output a frequency of the second driving voltage to achieve the effect of stabilizing a voltage value of the second driving voltage.

2. The electromagnetic coupling multi-output control circuit of claim 1, wherein the coupling unit is a coupling coil, and the detection unit is a voltage-division resistor for dividing the second driving voltage to produce the detection value.

3. The electromagnetic coupling multi-output control circuit of claim 2, wherein the switching unit comprises an error amplifier, a comparator, a triangular wave generator and a switcher, and the error amplifier has a positive input terminal for receiving the detection value and a negative input terminal for receiving a reference value, and an output terminal is coupled to a negative input terminal of the comparator, and a positive input terminal of the comparator is coupled to the triangular wave generator, and an output terminal of the comparator is coupled to the switcher, and a first terminal of the switcher is coupled to the coupling unit and a second terminal of the switcher is coupled to the second driving load respectively.

4. The electromagnetic coupling multi-output control circuit of claim 3, wherein the switcher comprises a diode, a transistor, a D-type flip-flop and a switch, and the transistor has a drain coupled to the coupling coil through the diode, a source coupled to the detection unit and the second driving load, and a gate coupled to a terminal of the switch, and the switch has a trigger terminal coupled to an output terminal of the D-type flip-flop, and the D-type flip-flop has an input terminal coupled to the output terminal of the comparator.

5. The electromagnetic coupling multi-output control circuit of claim 1, wherein the coupling unit is a coupling coil, and when there are a plurality of second driving loads connected in parallel with one another, the detection unit includes a multi-channel constant current circuit and a minimum voltage detection circuit, and the multi-channel constant current circuit is serially connected to the second driving loads to obtain a plurality of driving currents, and the minimum voltage detection circuit is electrically coupled to the multi-channel constant current circuit for detecting the driving currents to compute and obtain the detection value with the minimum voltage value.

6. The electromagnetic coupling multi-output control circuit of claim 5, wherein the multi-channel constant current circuit has a current mirror circuit architecture.

7. The electromagnetic coupling multi-output control circuit of claim 5, wherein the switching unit comprises an error amplifier, a comparator, a triangular wave generator and a switcher, and the error amplifier has a positive input terminal for receiving the detection value and a negative input terminal for receiving a reference value, and an output terminal is coupled to a negative input terminal of the comparator, and a positive input terminal of the comparator is coupled to the triangular wave generator, and an output terminal of the comparator is coupled to the switcher, and a first terminal of the switcher is coupled to the coupling unit and a second terminal of the switcher is coupled to the second driving load respectively.

8. The electromagnetic coupling multi-output control circuit of claim 7, wherein the switcher comprises a diode, a transistor, a D-type flip-flop and a switch, and the transistor has a drain coupled to the coupling coil through the diode, a source coupled to the detection unit and the second driving load, and a gate coupled to a terminal of the switch, and the switch has a trigger terminal coupled to an output terminal of the D-type flip-flop, and the D-type flip-flop has an input terminal coupled to the output terminal of the comparator.

9. The electromagnetic coupling multi-output control circuit of claim 1, wherein the power driving device is a fly-back, forward, full bridge, half bridge or push-pull switching power supply conversion circuit architecture.

10. The electromagnetic coupling multi-output control circuit of claim 1, wherein the transformer is electromagnetically coupled to a plurality of the electromagnetic coupling multi-output control circuits to output a plurality of second driving voltages, and the second driving voltages have different stable voltage values.

11. The electromagnetic coupling multi-output control circuit of claim 1, further comprising a driving capacitor coupled to the switcher and the second driving load for charging and discharging the second driving voltage to supply a stable voltage to the second driving load.

12. The electromagnetic coupling multi-output control circuit of claim 1, wherein the power driving device includes a buck circuit electrically coupled to the transformer for receiving and stepping down the input voltage and then outputting the input voltage to the transformer, so that the transformer provides the first driving voltage and the second driving voltage directly from sensing buck of input voltage to achieve effect of increasing a power factor.

* * * * *